United States Patent [19]

Conley

[11] 3,749,356

[45] July 31, 1973

[54] ADAPTOR COUPLING FOR FLUID FLOW CONDUITS

[75] Inventor: James Robert Conley, Wichita, Kans.

[73] Assignee: The Coleman Company, Inc., Wichita, Kans.

[22] Filed: Apr. 24, 1972

[21] Appl. No.: 246,940

[52] U.S. Cl............... 251/148, 251/149.4, 285/386, 222/3
[51] Int. Cl............................................. F16l 37/28
[58] Field of Search.................... 251/149.4, 148; 222/3; 285/12, 38, 39, 175, 176, 177, 384, 386

[56] References Cited
UNITED STATES PATENTS

| 1,898,617 | 2/1933 | Church | 285/386 X |
| 2,968,497 | 1/1961 | Treleman | 251/149.4 |
| 375,837 | 1/1888 | Scott | 251/149.4 X |
| 3,018,914 | 1/1962 | Webster | 222/3 X |
| 3,055,397 | 9/1962 | Vrshek | 222/3 X |

Primary Examiner—William R. Cline
Attorney—Dawson, Tilton, Fallon & Lungmus

[57] ABSTRACT

An adaptor coupling for fluid flow conduits includes a central hollow tube having a fluid flow passage therethrough, a first threaded coupler fitting secured to one end of the central tube, and a second threaded coupler fitting rotatably and slidably carried by the central tube. A hand wheel is secured to the second fitting to facilitate connection of the fitting to a fluid flow conduit, and the hand wheel is provided with lugs which extend toward the first fitting. The hand wheel and second fitting are slidable on the central tube between a first position in which the hand wheel can be freely rotated relative to the first fitting and a second position in which the lugs engage mating surfaces on the first fitting to cause the first fitting to rotate with the hand wheel.

10 Claims, 10 Drawing Figures

3,749,356

PATENTED JUL 31 1973

ADAPTOR COUPLING FOR FLUID FLOW CONDUITS

BACKGROUND

This invention relates to an adaptor coupling, and, more particularly, to an adaptor coupling in which a hand wheel can be used to connect first one fitting of the adaptor and then another to fluid flow conduits.

The invention finds particular utility in coupling combustible fuel powered appliances with fuel sources and will be explained in conjunction therewith. Appliances such as lanterns, stoves, catalytic heaters, and the like which are intended to be used outdoors and powered by fuel such as propane are well known.

Propane fuel for these appliances may be supplied either in conventional throw-away L-P containers or in larger, refillable bulk containers. The smaller throw-away LP containers generally are provided with a male fitting similar to that shown, for example, in U.S. Pat. No. 3,018,914, and the appliance may include a fuel flow conduit or hose which can be connected to the male fitting of the LP container. The larger refillable containers generally are provided with a fitting different from the male fitting of the throw-away container, and an appliance having a fuel hose which is adapted for connection to the fitting of either the throw-away container or the refillable container generally cannot be connected to the other type of container. For example, a refillable propane container may be conventionally provided with a standard POL valve which included an internally threaded female connector fitting.

It is desirable to permit an appliance to be used with either a throw-away LP container or a larger refillable container. For example, a propane lantern could be connected to a refillable tank at the campsite when mobility of the lantern is not important. However, when the lantern is to be carried by the camper, it is more convenient to use a smaller fuel tank which can be carried with the lantern.

If the appliance is to be used with both types of fuel containers, an adaptor must be provided for adapting the fuel hose of the appliance which is intended for use with one type of container to be used with the other type of container. Since such adaptors are frequently used outdoors, it is desirable that the adaptor be capable of quick, fuel-tight connection to both the fuel hose and the fuel tank and quick disconnection without the use of tools.

SUMMARY

This invention provides an adaptor which permits a pair of fluid flow conduits to be quickly connected without the use of wrenches, pliers, or other tools. One coupler fitting is secured to an elongated adaptor body, and the other coupler fitting is rotatably and slidably carried by the adaptor body. A hand wheel is fixed to the rotatable fitting to permit the fitting to be tightened by hand, and the hand wheel is provided with lugs which are engageable with mating surfaces on the other fitting to permit the hand wheel to be used to tighten that fitting. The fitting which is secured to the adaptor body can be connected to its associated fluid flow conduit by sliding the hand wheel axially toward the fitting so that the lugs engage the mating surfaces, and then rotating the fitting with the hand wheel. Thereafter, the hand wheel can be moved axially to move the lugs out of engagement with the first fitting, and the hand wheel can be used to connect the second fitting to its associated fluid flow conduit. The hand wheel is thus successively used as a torque-providing means for first one fitting and then the other to permit each fitting to be tightened by hand. If desired, the threads of the fittings can be of opposite hands so that accidental engagement of the lugs with the first fitting while the second fitting is being rotated will not loosen the first fitting.

DESCRIPTION OF THE DRAWING

The invention will be explained in conjunction with an illustrative embodiment shown in the accompanying drawing, in which.

DESCRIPTION OF SPECIFIC EMBODIMENT

Figure 1:
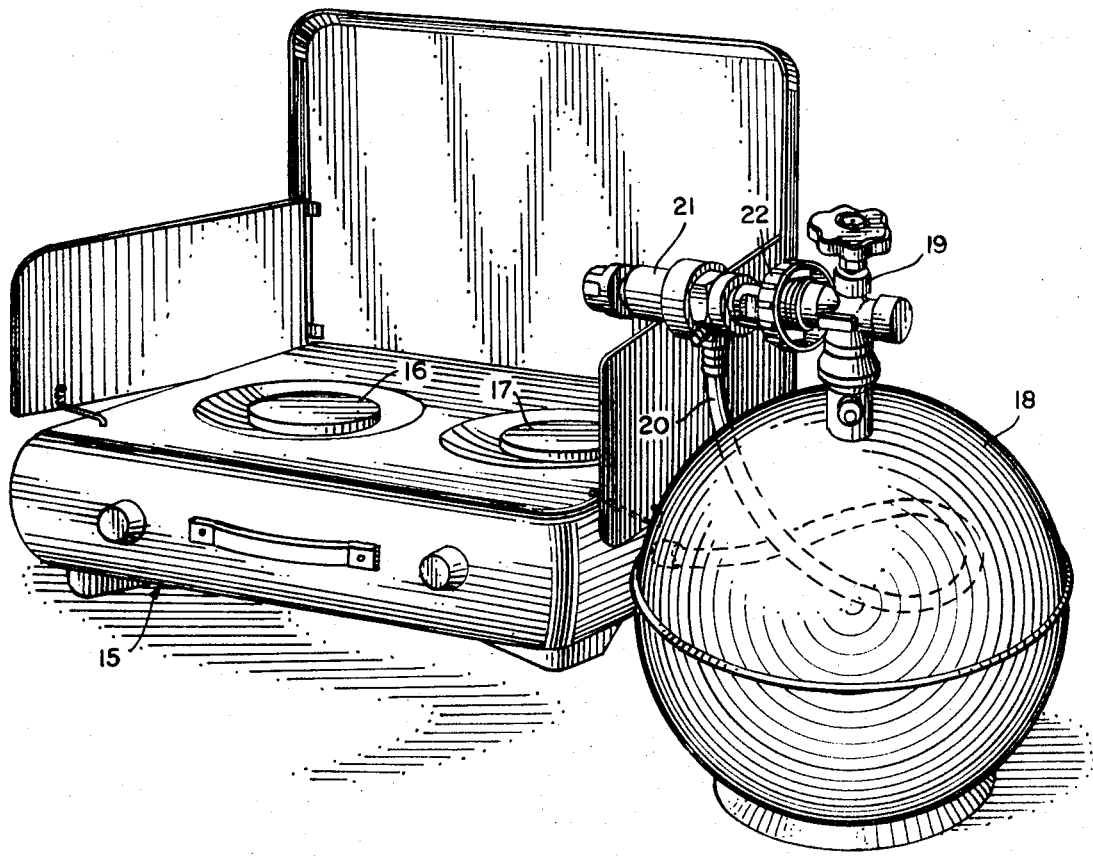
FIG. 1 is a perspective view of a propane camping stove and a refillable propane tank for supplying fuel to the stove.

Referring to FIG. 1, a conventional propane camping stove 15 having burners 16 and 17 is supplied with propane fuel by a large, refillable propane tank 18 which is equipped with a conventional POL valve 19. The stove is equipped with a fuel hose or conduit 20 which is connected to a fuel regulator 21, and the fuel regulator is connected to the POL valve by adaptor coupling 22.

Figure 2:
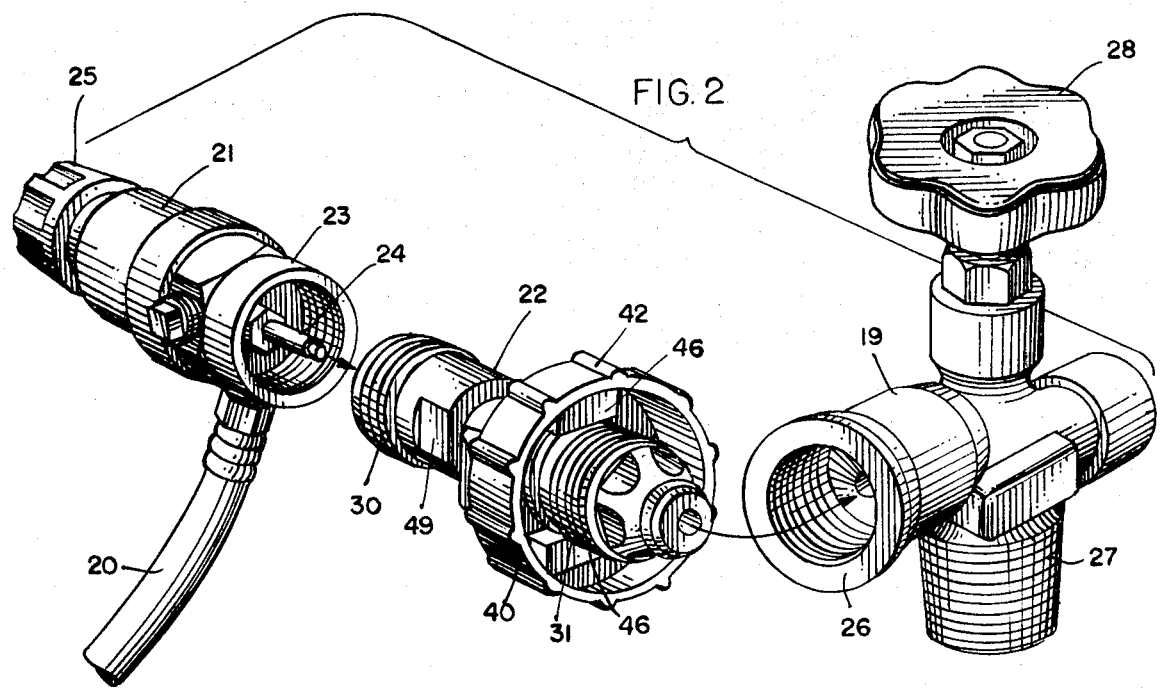
FIG. 2 is an exploded perspective view of the regulator for the stove, the adaptor coupling, and the valve of the propane tank.
Figure 3:
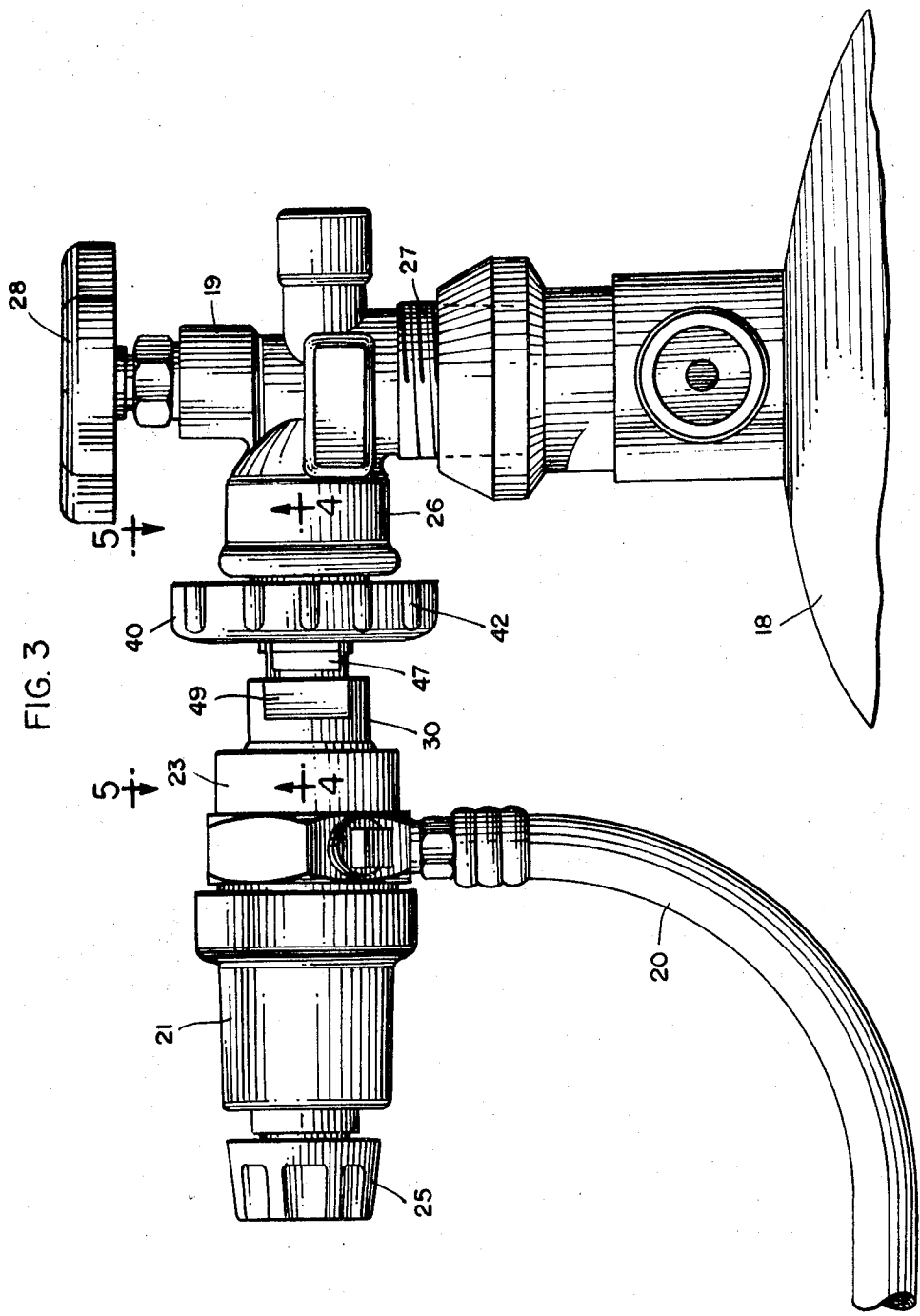
FIG. 3 is a side elevational view of the parts of FIG. 2 as assembled.

The fuel regulator 21 is adapted to be connected to a conventional throw-away propane container and includes an internally threaded female fitting 23 (FIG. 2) which can be threadedly engaged with the conventional male bushing of such a container and a probe 24 which is designed to open the core valve which is conventionally positioned within the male bushing of such a container and a probe 24 which is designed to open the core valve which is conventionally positioned within the male bushing of the propane container. The probe is provided with an internal passage through which the propane can flow, and the amount of fuel supplied to the fuel line 20 can be regulated by adjusting knob 25.

The standard POL valve 19 includes an internally threaded female fitting 26, a male fitting 27 which is threaded into the propane tank, and a hand wheel 28 for opening and closing the valve.

The connector fittings 23 and 26 of the regulator 21 and POL valve 19 are both internally threaded and are generally provided with different types of threads. The adaptor coupling 22 must therefore be used to interconnect the regulator 21 and the valve 19, which provide flow conduits for the propane fuel.

Figure 4:
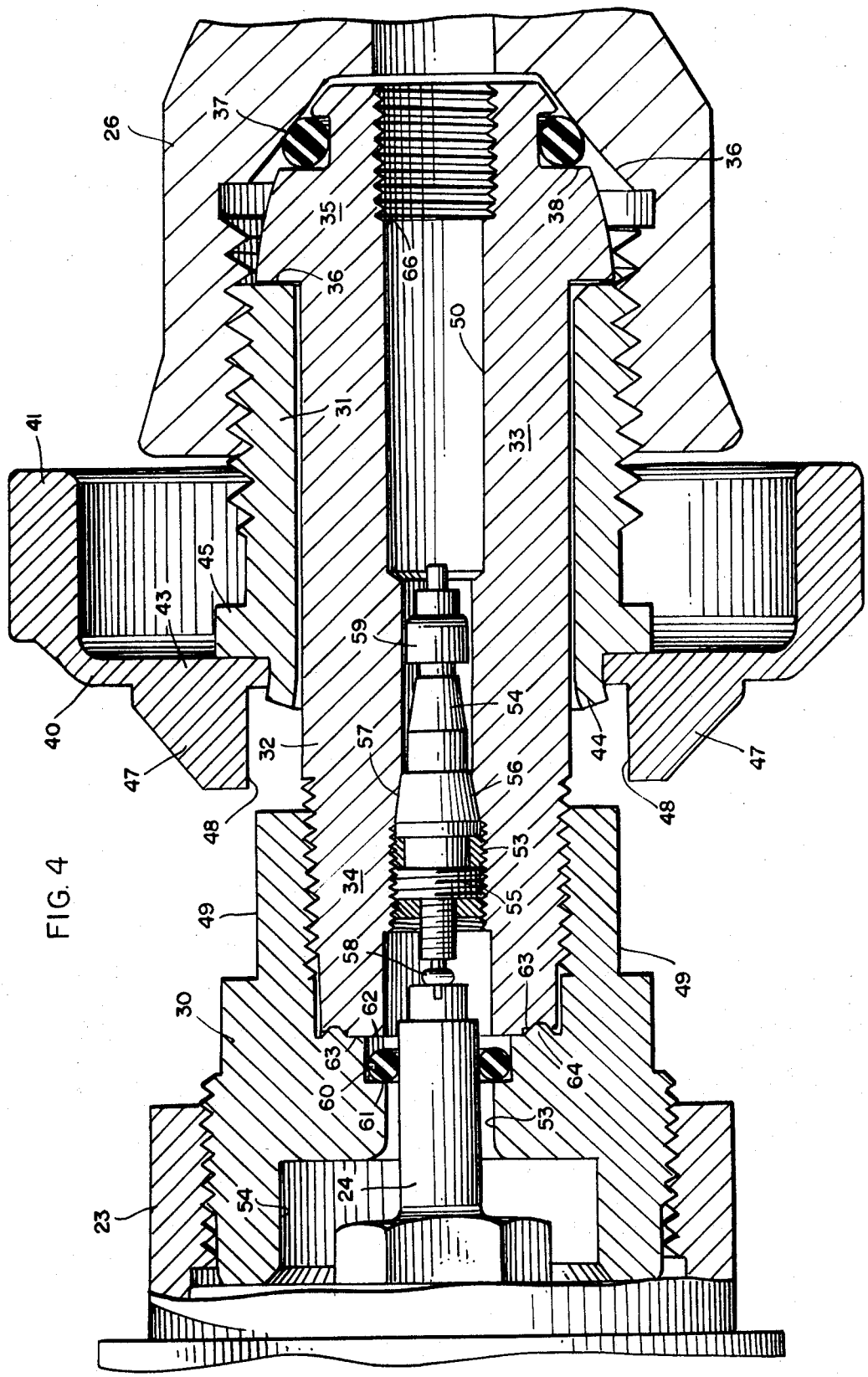
FIG. 4 is an enlarged fragmentary sectional view taken along the line 4—4 of FIG. 3.
Figure 5:
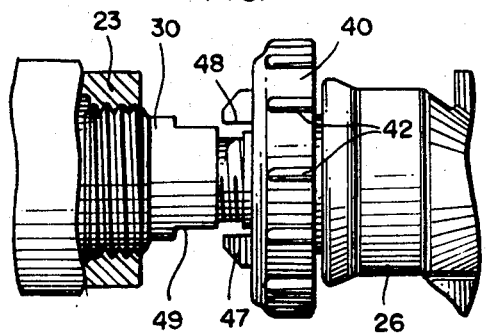
FIG. 5 is a fragmentary view taken along the line 5—5 of FIG. 3.

The adaptor coupling 22 includes a first male coupler fitting 30 which is provided with external threads adapted to engage the internal threads of the regulator fitting 23 and a second male coupler fitting 31 which is provided with external threads adapted to engage the internal threads of the valve fitting 26. The fitting 31 is generally cylindrical (FIG. 4) and is rotatably and slidably ensleeved on an elongated central tube or adaptor body 32. The adaptor body includes a cylindrical central portion 33 and an externally threaded end 34 which is threadedly engaged with mating threads on the coupler fitting 30. The other end of the adaptor body includes a generally bullet-shaped nose 35 which includes a radially outwardly extending shoulder 36 which retains the coupler fitting 31 on the cylindrical center portion of the adaptor body. The curved surface of the nose portion 35 is adapted to mate with and seat in the cup-shaped seating surface 36 which is provided in the conventional POL valve. A fluid-tight seal is provided between the nose 35 and the valve seat 36 by an O-ring 37 which is received in an annular groove 38 in the nose and which extends outwardly beyond the curved surface thereof.

The coupler fitting 31 can be rotated on the adaptor body 32 by hand wheel or knob 40 which is fixedly secured thereto. The hand wheel includes a generally cylindrical side wall 41 which is provided with circumferentially spaced gripping ribs 42, and an end wall 43 which is provided with a central opening sized to receive cylindrical end portion 44 of the coupler fitting 31. The hand wheel is inserted over the cyindrical end portion 44 of the fitting until it abuts the radially outwardly extending annular shoulder 45 thereon, and the hand wheel is secured by swaging the end portion 44 outwardly into secure engagement with the end wall 43 of the wheel. Relative rotation between the hand wheel and the fitting 31 is prevented by engagement of diametrically opposed lugs 46 (FIGS. 2 and 7) on the hand wheel which engage flats 45a in the annular shoulder 45.

The hand wheel includes a pair of generally diametrically opposed lugs 47 which extend from the end wall 43 toward the coupler fitting 30 and which provide flat shoulders 48. The shoulders 48 are positioned slightly radially outwardly of flats 49 which are provided on the generally cylindrical coupler fitting 30, and the hand wheel and coupler fitting 31 may slide axially along the adaptor body 32 to permit the shoulders 48 of the hand wheel to overlie the flats 49 so that the coupler fitting 30 will be caused to rotate with the hand wheel as the shoulders engage the flats.

The adaptor body 32 is provided with a longitudinally extending central passage 51 which communicates with an axially aligned central passage 52 in the coupler fitting 30. The passage or bore 51 is provided with a threaded portion 53 adjacent the end which is connected to the coupler fitting 30 for threadedly receiving a conventional tire or core valve 54. The tire valve is well known and need not be described in detail. It is sufficient to say that the valve includes an externally threaded portion 55 which engages the threaded portion 51 of the bore, a frusto-conical seat portion 56 which seats in a frusto-conical flared portion 57 of the bore, an actuating stem, and a seal 59.

An O-ring 60 is received in an annular recess 61 in the bore 52 of the coupler fitting 30. The threaded end of the adaptor body terminates in a flat annular face 62 which abuts a flat face 63 on the coupler fitting 30, and a circular rib 64 on the fitting is received by a correspondingly shaped recess in the adaptor body.

When the stove 15 or other appliance is to be supplied by a throw-away propane container, the regulator 21 can be connected directly to the container so that fuel can flow through the probe 24, the regulator 21, and the fuel line 20 to the appliance.

When it is desired to power the appliance by a large refillable container such as the container 18, the regulator is removed from the small fuel container. The hand wheel 40 and the coupler fitting 31 of the adaptor are then moved axially along the adaptor body toward the coupler fitting 30 of the adaptor, and the hand wheel is rotated as necessary to permit the shoulders 48 to slide axially over the flat surfaces 49 on the coupler fitting 30. The shoulders 48 will then matingly engage the flats 49 and the shoulders and flats will act as abutment means so that rotation of the hand wheel 40 will cause rotation of the coupler fitting 30 and the adaptor body 32. The coupler fitting 30 can then be easily screwed into the fitting 23 of the regulator 21 by turning the hand wheel, which acts as a torque-providing means for the generally cylindrical coupler fitting. As the coupler fitting 30 is screwed into the regulator fitting 23 (FIGS. 6 and 7) the probe 24 passes through the O-ring 59 and is sealingly engaged thereby. As the coupler fitting 30 is tightened upon the regulator fitting 23, the probe 24 will contact the actuating stem 58 of the core valve and push the stem and the seal 59 axially to the right as viewed in FIGS. 4 and 6, thereby opening the core valve. A fluid-tight seal is maintained between the coupler fitting 30 and the regulator fitting 23 by the O-ring 60, and the connection between these fittings need by only hand tight.

Figure 6:
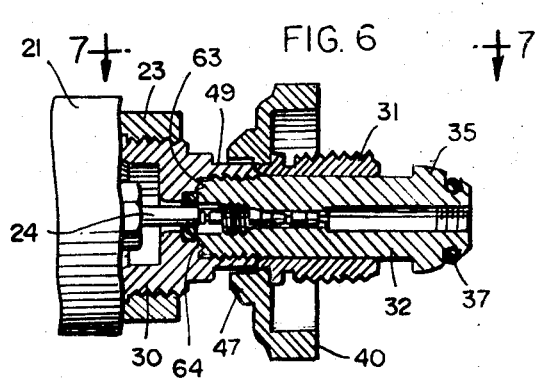
FIG. 6 is a view similar to FIG. 4 showing the hand wheel in position to connect the adaptor to the regulator.
Figure 7:
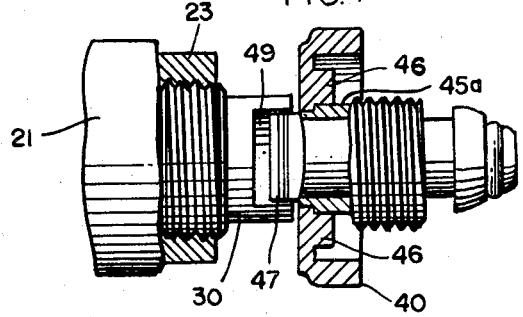
FIG. 7 is a fragmentary view, partially broken away, taken along the line 7—7 of FIG. 6.

After the adaptor is connected to the regulator, the hand wheel 40 and the attached coupler fitting 31 can be moved axially to the right as viewed in FIGS. 6 and 7 until the coupler fitting 31 abuts the shoulder 36 of the bullet-shaped nose 35. In this position, the lugs 47 are axially offset from the flats 49, and the hand wheel can be rotated freely on the adaptor body without engaging the coupler fitting 30. The hand wheel can then be used to screw the coupler fitting 31 into the POL valve fitting 26. As the coupler fitting 31 is tightened within the POL valve, the O-ring 37 is compressed by the seat 36 of the valve and provides a fluid-tight seal between the valve and the adaptor when the fitting is merely hand tightened. The fitting 31 rotates on the adaptor body as it is screwed into the POL valve, and the adaptor body and the regulator will remain stationary.

The POL Valve can then be opened by turning the valve handle 28, and the regulator 21 can be opened by turning the knob 25. Fuel will flow from the tank through the POL valve, the central bore 50 of the adaptor body, the core valve 54, the central bore of the probe 24, the regulator 21, and the fuel line 20 to the appliance.

When it is desired to disconnect the appliance from the refillable fuel tank, the hand wheel 40 is rotated to unscres the coupler fitting 31 from the POL valve. The hand wheel 40 can then be moved axially along the adaptor body until the shoulders 48 of the lugs 47 engage the flats 49 of the coupler fitting 30, and the hand wheel can then be used to unscrew the coupler fitting 30 from the regulator.

If the regulator is unscrewed from the coupler fitting 30 before the adaptor is removed from the POL valve and before the valve is closed, the core valve 54 will close as the probe 24 is withdrawn, thereby preventing leakage of fuel.

The threads of a conventional POL valve are left hand, and the threads of the coupler fitting 31 would then also be left hand. The threads of the male bushing of a conventional throw-away propane container are conventionally right hand, and the threads of the regulator fitting 23 and the coupler fitting 30 would also be right hand. Since the threads of the coupler fittings 30 and 31 are of opposite hand, if the hand wheel 40 should happen to engage the flats 49 while the fitting 31 is being screwed into the POL valve, the coupler fitting 30 would only be further tightened within the regulator fitting 23 rather than being loosened, thereby preventing inadvertent opening of the seal between the adaptor and the regulator.

Figure 8:
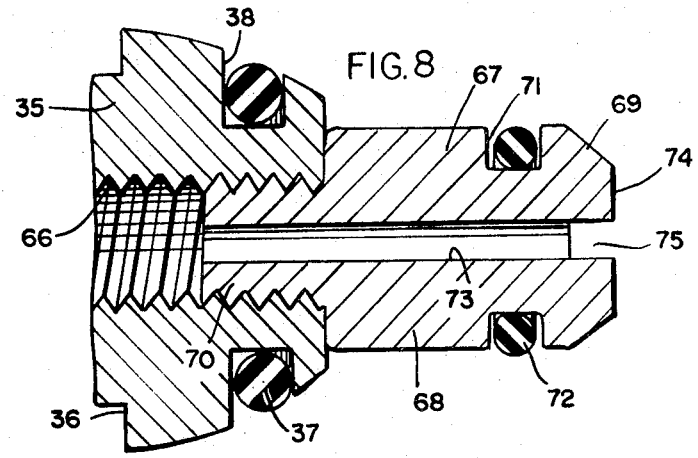
FIG. 8 is an enlarged fragmentary view of one end of the adaptor which is provided with a second adaptor fitting.
Figure 9:
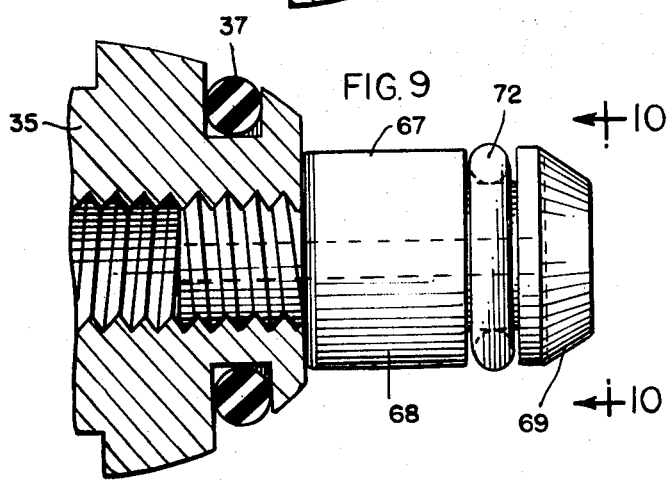
FIG. 9 is a view similar to FIG. 8 showing the second adaptor fitting in solid.
Figure 10:
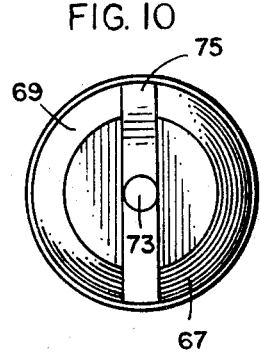
FIG. 10 is an end view taken along the line 10—10 of FIG. 9.

FIGS. 8–10 illustrate a second adaptor which permits the adaptor 22 to connect the regulator 21 to a fuel tank having a valve with a push-in connection such as the Model 5410–750 propane bottle available from The Coleman Company, Inc. FIGS. 8 and 9 illustrate the bullet-nose end portion of the adaptor body 32, and this end of the bore 50 of the adaptor body is provided with internal threads 66. An adaptor or probe 67 includes a generally cylindrical body 68, a frusto-conical nose 69, and an externally threaded attaching portion 70 of reduced diameter. The cylindrical body 58 is provided with an annular recess 71 adjacent the nose 69 which receives an O-ring 72. A central bore 73 extends through the adaptor 67, and the flat end 74 thereof is provided with a transversely extending slot 75.

The adaptor 67 is connected to the adaptor 22 by screwing the threaded portion 70 into the internally threaded portion of the bore 50, and screwdriver or coin can be inserted into the slot 75 to facilitate this connection. Thereafter, the regulator and the adaptor 22 can be connected to the propane container merely by pushing the adaptor 67 into the valve of the container. The O-ring 72 providing a fluid-tight seal between the valve and the adaptor 67.

While in the foregoing specification, a detailed description of a specific embodiment of the invention was set forth for the purpose of illustration, it is to be understood that many of the details hereingiven may be varied considerably by those skilled in the art without departing from the spirit and scope of the invention.

I claim

1. An adaptor coupler for connecting a fuel tank having an internally threaded POL valve to a fuel flow conduit having a connector fitting comprising an elongated adaptor body having a pair of ends and a generally cylindrical central portion, the adaptor body being provided with a longitudinally extending fuel flow passage therethrough, one of the ends of the adaptor body being provided with a generally bullet-shaped nose extending radially outwardly from the central portion of the adaptor body and being adapted to be received by the POL valve, a first coupler fitting secured to the other end of the adaptor body and having threads adapted to be threadedly engaged with the connector fitting of the fuel flow conduit, a second externally threaded generally cylindrical male coupler fitting rotatably and slidably received on the central portion of the adaptor body and adapted to be threadedly engaged with the threads of the POL valve, knob means secured to the second coupler fitting and extending radially outwardly for rotating the second coupler fitting about the central portion of the adaptor body, at least a pair of lugs extending axially from the knob means toward the first coupler fitting, the first coupler fitting having at least a pair of lug-engaging surfaces which are engageable with the lugs to permit the first coupler fitting to be rotated by the hand wheel, the spacing between the first coupler fitting and the bullet-shaped nose being such that the second coupler fitting and the knob means are slidable axially between a first position in which the lugs engage the lug-engaging surfaces of the first coupler fitting whereby the first coupler fitting may be rotated by the knob means to threadedly engage the first coupler fitting to the fuel flow conduit and a second position in which the knob means may rotate without the lugs engaging the first fitting whereby the second fitting may be threadedly engaged with the POL valve without rotating the first coupler fitting.

2. The structure of claim 1 in which the bullet-shaped nose is provided with an annular recess and a compressible O-ring is received by the recess.

3. The structure of claim 1 including valve means positioned within the fluid passage of the adaptor body for closing the fluid passage therethrough when the first fitting is not engaged with the connector fitting of the fuel flow conduit.

4. The structure of claim 3 in which the first coupler fitting is provided with a central passage axially aligned with the passage through the adaptor body, the valve means being adapted to be opened by a probe carried by the fuel flow conduit and having a central passage therein, and an O-ring positioned within the central passage of the first coupler fitting for sealingly engaging the probe.

5. The structure of claim 1 in which the knob means comprises a hand wheel.

6. An adaptor coupler for connecting a pair of internally threaded female fittings comprising an elongated adaptor body having a pair of ends and a fluid flow passage therethrough, one of the ends of the adaptor body being adapted to sealingly engage one of the female fittings, externally threaded male coupling means on the other end of the adaptor body and being adapted to threadedly engage the other female fitting, an externally threaded generally cylindrical male coupler fitting rotatably and slidably mounted on the adaptor body and adapted to threadedly engage said one female fitting, knob means on the male coupler fitting for rotating the coupler fitting about the adaptor body, abutment means on the male coupler fitting and abutment means on the adaptor body, the spacing between the abutment means on the adaptor body and said one end of the adaptor body being such that the male coupler fitting is slidable axially between a first position in which the abutment means on the male coupler fitting engage the abutment means on the adaptor body whereby the adaptor body may be rotated by rotating the male coupler fitting to threadedly engage the male coupling means on the adaptor body with said other female fitting and a second position in which the male coupler fitting may rotate without the abutment means thereon engaging the abutment means on the adaptor body whereby the male coupler fitting may be threadedly engaged with said one female fitting without rotating the adaptor body and the male coupling means thereon.

7. The structure of claim 6 in which the male coupling means on the adaptor body comprises an externally threaded male coupler fitting secured to the other end of the adaptor body.

8. The structure of claim 6 in which the male coupling means on the adaptor body comprises an externally threaded male coupler fitting secured to the other end of the adaptor body and the abutment means on the adaptor body comprises a plurality of flat surfaces on the male coupler fitting secured to the other end of the adaptor body.

9. The structure of claim 6 in which the knob means comprises a hand wheel secured to the male coupler fitting.

10. The structure of claim 6 in which the male coupling means on the adaptor body comprises an externally threaded male coupler fitting secured to the other end of the adaptor body, the knob means comprising a hand wheel secured to the male coupler fitting which is rotatably and slidably mounted on the adaptor body, the abutment means on the adaptor body comprising a plurality of flat surfaces on the male coupler fitting which is secured to the other end of the adaptor body, the abutment means on the male coupler fitting which is rotatably mounted on the adaptor body comprising lug means on the hand wheel extending axially toward said other end of the adaptor body, the lug means being spaced slightly radially outwardly from the flat surfaces on the male coupler fitting which is secured to said other end of the adaptor body.

* * * * *